United States Patent
Xu et al.

(10) Patent No.: US 7,194,177 B2
(45) Date of Patent: Mar. 20, 2007

(54) STRESS-INDUCED CONTROL OF POLARIZATION DEPENDENT PROPERTIES IN PHOTONIC DEVICES

(75) Inventors: Dan-Xia Xu, Gloucester (CA); Pavel Cheben, Ottawa (CA); Dan Dalacu, Ottawa (CA); Siegfried Janz, Gloucester (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 10/951,716

(22) Filed: Sep. 29, 2004

(65) Prior Publication Data

US 2005/0196114 A1    Sep. 8, 2005

Related U.S. Application Data

(60) Provisional application No. 60/547,078, filed on Feb. 25, 2004.

(51) Int. Cl.
    *H01L 21/00* (2006.01)
(52) U.S. Cl. ........................... 385/132; 438/29
(58) Field of Classification Search ............... 385/132, 385/123; 427/163.2; 438/29
    See application file for complete search history.

(56) References Cited

U.S. PATENT DOCUMENTS

| 4,354,736 A | * | 10/1982 | Maklad et al. | ............... 385/125 |
| 4,900,112 A | * | 2/1990 | Kawachi et al. | ............... 385/14 |
| 6,580,864 B1 | * | 6/2003 | Temkin et al. | ............... 385/132 |
| 2001/0024559 A1 | * | 9/2001 | Kling | ............... 385/132 |
| 2002/0122651 A1 | * | 9/2002 | Roberts | ............... 385/132 |
| 2004/0013337 A1 | * | 1/2004 | Purchase et al. | ............... 385/14 |
| 2004/0247243 A1 | * | 12/2004 | Hida et al. | ............... 385/37 |
| 2005/0196117 A1 | * | 9/2005 | Harwood | ............... 385/129 |

OTHER PUBLICATIONS

Dai et al., "Analysis of the birefringence of a silicon-on-insulator rib waveguide", Feb. 10, 2004, App. Optics, vol. 43, No. 5, 1156-5525.*
Polarization Insensitive, Low-Loss, Low-Crosstalk Wavelength Multiplexer Modules—Christoph K. Nadler et al 1077-260X/99 1999 IEEE.
Design of Polarization-insensitive components Using geometrical and stress-induced birefringence in SOI waveguides—D.X. XU—Institute for microstructural Sciences NRC Canada Ottawa Canada.
Stress effects on the performance of optical waveguides—M. Huang—Mechanical and Aerospace Engineering Department and Princeton Materials Institute.
Recent Advance in High-Density and Large-Scale AWG Multi/Demultiplexers With Higher Index-Contrast Silica-Based PLCs—Yoshinori Hibino IEEE Journal of Selected Topics in quantum Electronics, vol. 8, No. 6, Nov./Dec. 2002.
Recent Progress in the Design, Simulation and Fabrication of Small Cross-Section Silicon-on-Insulator VOAs—R.R. Whiteman et al—Bookham Technology Plc, Abingdon, Oxon UK.

(Continued)

*Primary Examiner*—Frank G. Font
*Assistant Examiner*—James P. Hughes
(74) *Attorney, Agent, or Firm*—Marks & Clerk; Richard J. Mitchell

(57) ABSTRACT

In order to make a photonic device incorporating a waveguide, a waveguide is formed with a predetermined geometry. Birefringence is then controlled by determining the amount of stress induced within the waveguide.

19 Claims, 5 Drawing Sheets

OTHER PUBLICATIONS

Polarization-independent single-mode rib waveguides on silicon-on-insulator for telecommunication wavelengths—L. Vivien et al—Institut d'Electronique Fondamentale—Orsay, Cedex, France Feb. 14, 2002.

Control and Compensation of Birefringence in SOI Waveguides—D.X. Xu et al—Annual Meeting of IEEE Lasers & Electro-Optics Society Tuscon USA Oct. 26, 2003.

Design of Polarization-Insensitive SOI Ring Resonators Using Cladding Stress-Induced Birefringence and MMI Couplers—D.X. Xu et al Institute for Microstructural Sciences, NRC Ottawa, Canada.

Control of SOI Waveguide Polarization Properties for Microphotonic Applications—D.X. Xu et al—Institute for Microstructural Sciences, NRC, Ottawa. Canada.

Eliminating the birefringence in silicon-on-insulator ridge waveguides by use of cladding stress—D.X. Xu et al—Institute for Microstructural Sciences, NRC, Ottawa, Canada.

Birefringence Control Using Stress Engineering in Silicon-pon-Insulator (SOI) Waveguides—Winnie N. Ye et al National Science and Engineering Research Council and the NRC, Ottawa, Canada.

* cited by examiner

CHARACTERISTICS
OF PRIOR ART

CHARACTERISTICS
OF PRIOR ART

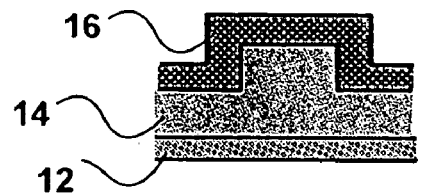
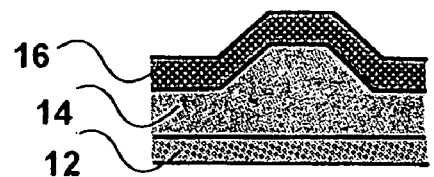
FIG. 5b
FIG. 5c
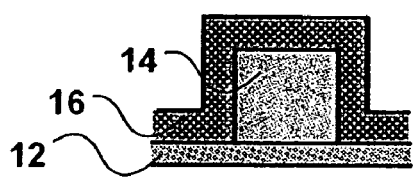
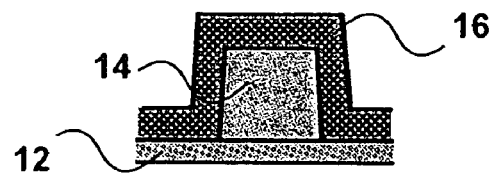
FIG. 5d
FIG. 5e
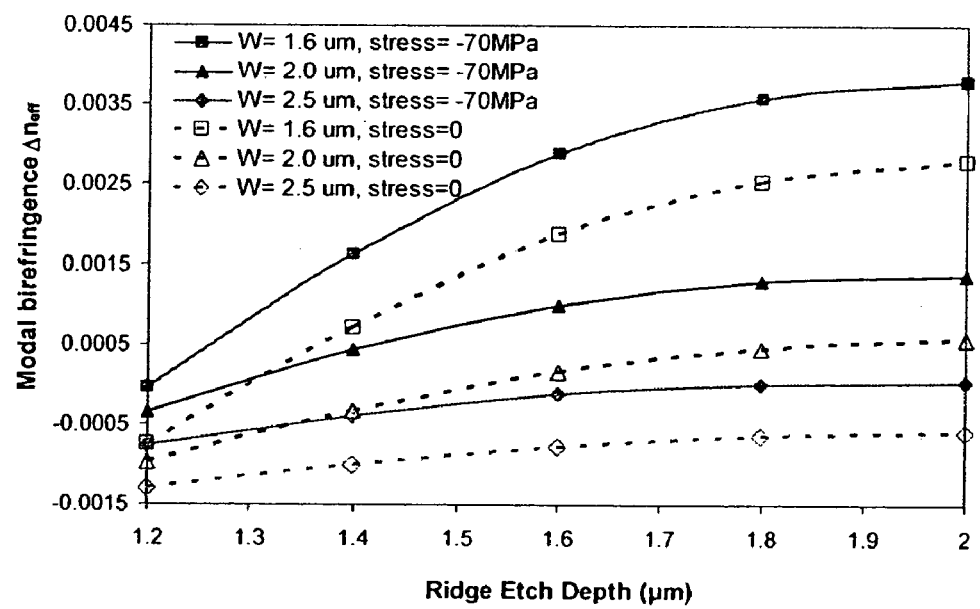
FIG. 6

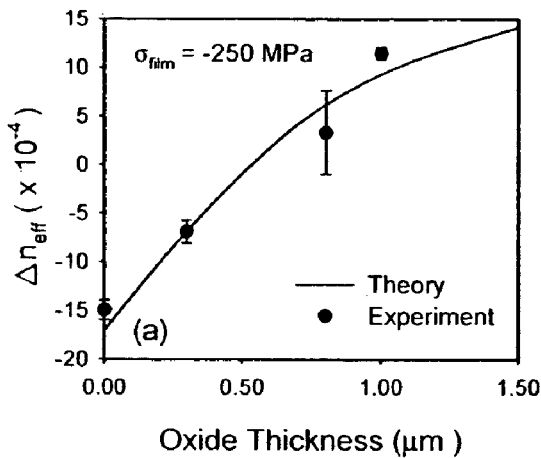
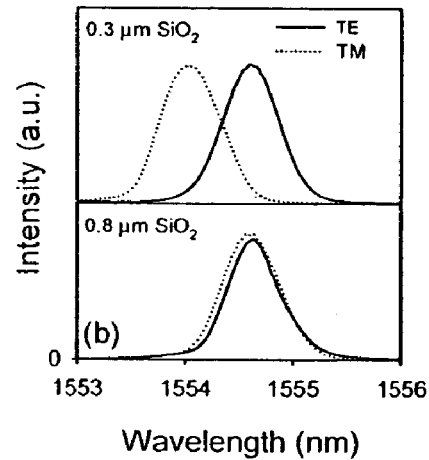
FIG. 7a  FIG. 7b
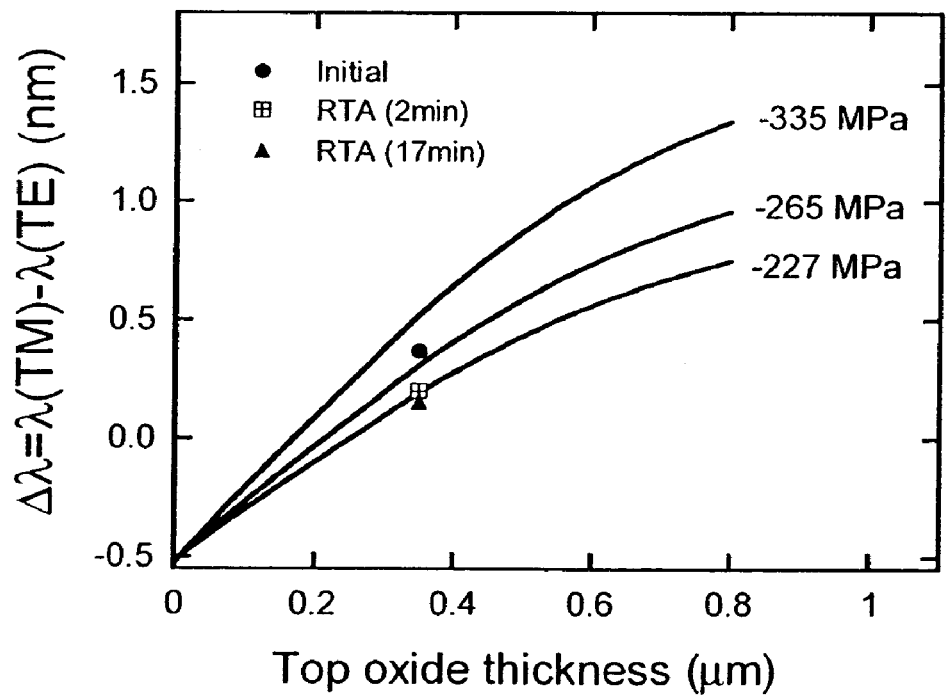
FIG. 8

STRESS-INDUCED CONTROL OF POLARIZATION DEPENDENT PROPERTIES IN PHOTONIC DEVICES

CROSS REFERENCE TO RELATED APPLICATION

This application claims the benefit under 35 USC 119(e) of U.S. provisional application No. 60/547,078 filed on Feb. 25, 2004, the contents of which are incorporated herein by reference.

FIELD OF THE INVENTION

This invention relates to photonic devices with controlled polarization dependent properties and methods of making the same.

BACKGROUND OF THE INVENTION

In photonic devices incorporating waveguides, mode transmission is affected both by the material anisotropy, and by the cross-sectional geometry of waveguides. An example of the structures under discussion is illustrated schematically in FIG. 1. The waveguides include a core and cladding layers and generally interfaces between the core and cladding layers impose different boundary conditions for modes of propagation with different polarizations. These effects induce a polarization dependent loss (PDL), and a polarization dependent refractive index.

Modes with electrical field polarized perpendicular to the wafer plane are defined herein as TM, and parallel to the wafer plane as TE. The modal birefringence is defined as $\Delta n_{eff} = n_{eff}^{TM} - n_{eff}^{TE}$, where $n_{eff}^{TM}$ and $n_{eff}^{TE}$ are the effective indices for the TM-like and TE-like modes in the channel waveguide. In many types of integrated optical device, it is critical to either eliminate the birefringence altogether, or to adjust it to a given value.

Optical waveguide components and devices for communication applications are required to be polarization insensitive. As communication systems advance, the tolerance for polarization sensitivities becomes more stringent. Planar waveguide technology has made significant progress in replacing discrete photonic devices, such as thin film and bulk-optic components. The demand for increased functionality and reduced cost continues to drive the downscaling of device sizes, which can be achieved by reducing waveguide cross-section areas in high index contrast (HIC) material platforms.

Highly compact photonic devices can be implemented in high index contrast (HIC) material systems such as silicon-on-insulator (SOI), SiN on $SiO_2$, and III–V semiconductors. In state-of-the-art commercial devices using SOI, the core size is typically on the order of 5 μm and the geometrical birefringence can be minimized to an acceptable level by changing the cross-sectional dimensions of the waveguides. This technique is sufficient for devices with large core size, since their geometrical birefringence is relatively low. Such devices, however, are of comparable size to those based on glass waveguides, and the size-reduction potential of SOI is unutilized.

One source of modal birefringence in channel waveguides is solely caused by the cross-sectional geometry of the waveguides, herewith denoted as geometrical birefringence $\Delta n_{geo}$. As the waveguide size is reduced, $\Delta n_{geo}$ can become very large as shown in FIG. 2. Although the condition for birefringence-free propagation may still exist, the birefringence becomes very sensitive to the fluctuations in the waveguide dimensions. To achieve control within the tolerance range of state-of-the-art photonic devices, cross-sectional dimension control in the order of 10 nm is required. This stringent requirement is technologically a challenge and may be very expensive to implement. Furthermore, ridge dimensions also determine the number of waveguide modes, the minimum bend radius, and the mode size. It is often impossible to simultaneously meet several design objectives, including zero birefringence, using waveguide dimensions alone. These are some of the reasons why small-size SOI waveguide devices are not currently available commercially. Viable means of producing polarization insensitive devices or providing birefringence tuning are required.

Current practice to either eliminate birefringence, or to adjust the birefringence to a desired level (D. Dimitropoulos, V. Raghunathan, R. Claps, and B. Jalali, 'Phase-matching and nonlinear optical processes in silicon waveguides', Optics Express 12(1), p. 149, 2004) is to adjust the waveguide width to depth ratio (L. Vivien, S. Laval, B. Dumont, S. Lardenois, A. Koster, and E. Cassan: "Polarization-independent single-mode rib waveguides on silicon on insulator for telecommunications wavelengths", Opt. Commun. 210, p. 43, 2002). Limitations of this method on the associated stringent requirement on dimensional inaccuracies are beginning to be recognized (Daoxin Dai, Sailing He, 'Analysis of the birefringence of a silicon-on-insulator rib waveguide', Applied Optics 43(5), p. 1156, 2004.

In conventional HIC waveguides where the core size is in the order of 5 μm, geometrical birefringence is on the order of $10^{-4}$. Satisfactory control can be achieved by adjusting waveguide cross-sections. This technique is sufficient for devices with large core size, since the geometrical birefringence is relatively low, waveguide modes are well confined within the core area, and generally large bend radii are used.

With reducing waveguide core size, the geometrical modal birefringence $\Delta n_{geo}$ increases drastically. The rate of change with dimensions also becomes very large. In FIG. 2, the birefringence change with waveguide dimensions is shown for an example of waveguide cross-section, but similar dependence can be found in other types of cross-sections when waveguide dimensions are reduced. By choosing the ridge aspect ratio appropriately, the birefringence may in principle be eliminated. For a given waveguide width W, an aspect ratio may exist at which the orthogonally polarized modes becomes degenerate (i.e. birefringence-free), as indicated by the circles in FIG. 3. Obviously, for waveguides with high geometrical anisotropy (e.g. for W>>H), this particular condition may not be possible to fulfill.

Ridge dimensions also determine the number of waveguide modes, the minimum usable bend radius and the mode size, as well as the birefringence. It is often impossible to simultaneously meet several design objectives, including zero birefringence, using waveguide dimensions alone.

Ridge dimensions also determine the sensitivity of birefringence to dimension fluctuations, as illustrated in an example in FIG. 3 for etch depth and waveguide width. Wide waveguides (W>H) are less sensitive to dimension changes, and offer better process latitude. Unfortunately, the condition for $\Delta n_{geo}=0$ may cease to exist.

SUMMARY OF THE INVENTION

The invention makes use of stress fields in the design of waveguides to control polarization dependant loss and polarization dependent refractive index. In accordance with the principles of the invention cladding stress induced birefringence is taken into account in the waveguide design, enabling the birefringence to be decoupled from geometrical constraints. The novel technique achieves the final desired birefringence with a combination of the stress-induced and geometrical birefringence. Waveguide dimensions can thus be optimized to meet other design criteria, giving an enhanced degree of design freedom.

Waveguide birefringence is the sum of geometrical birefringence and stress-induced birefringence. The importance of stress-induced birefringence in SOI waveguides has not been recognized in the current literature. Geometrical asymmetry was thought to dominate (Daoxin Dai, Sailing He, 'Analysis of the birefringence of a silicon-on-insulator rib waveguide', Applied Optics 43(5), p. 1156, 2004).

In one aspect the invention provides a method of making a photonic device incorporating a waveguide, comprising forming the waveguide with a predetermined geometry; and controlling birefringence by stress induced within said waveguide.

A device employing a cladding material with unspecified stress using this technique would have an exhibited a final specified birefringence not in accordance with the geometrical birefringence of the phase controlling section of the waveguide device. It is non-trivial to determine the stress on a processed device. On the other hand, geometries and the composition of materials (core, cladding) are straight forward to determine. Once the geometry and the materials are known (therefore the material refractive indices), the geometrical birefringence is deterministic.

In another aspect the invention provides a photonic device comprising a waveguide; wherein birefringence is controlled by means of stress induced within said waveguide; and wherein said device has an exhibited specified birefringence that is different from the birefringence as determined by the geometry of said device.

It will be appreciated that in some case it may be desirable to adjust the birefringence to a specified value; on other cases it may be desirable to adjust it to zero, and the latter is clearly contemplated by the invention.

Cladding materials used in planar waveguides usually have different thermal expansion coefficients than the core material that consequently induces stress in the waveguides. Intrinsic stress can also be present. Through the photoelastic effect, the stress causes optical anisotropy, and renders the waveguide materials birefringent. The effective indices of the modes are hence modified. By choosing the correct magnitude and sign of the stress (being tensile or compressive), and appropriate local stress field, waveguide birefringence can be tuned for any waveguide shape and dimensions. Birefringence-free operations can be extended to waveguides with non-zero geometrical birefringence.

BRIEF DESCRIPTION OF THE DRAWINGS

The invention will now be described in more detail, by way of example only, with reference to the accompanying drawings, in which:

FIG. 6 shows the calculated change in modal birefringence as a function of ridge etch depth (D=H−h) with a 0.7 µm thick oxide cladding film.

FIG. 7(a) shows the variation of birefringence with $SiO_2$ cladding thickness for a wet etched SOI ridge waveguide, and (b) TE and TM channel spectra for an SOI AWG compensated using 0.3 (top right) and 0.8 µm (bottom right) thick $SiO_2$ claddings.

FIG. 8 shows the calculated (solid lines), and measured $\Delta\lambda$ values (data points) for AWGs with rapid thermal anneal tuning (RTA).

DETAILED DESCRIPTION OF THE PREFERRED EMBODIMENTS

Figure 1:
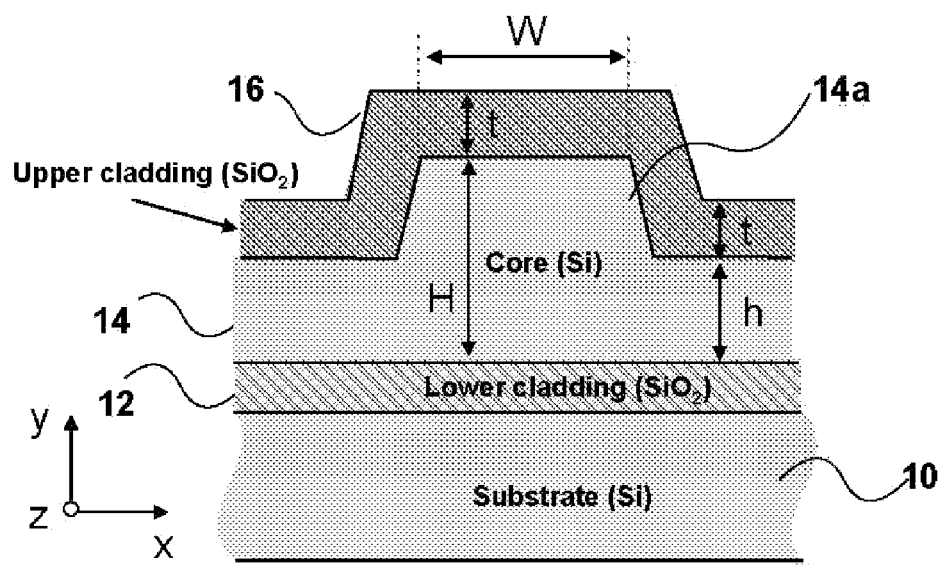
FIG. 1 is a schematic cross-section of a channel waveguide using the SOI platform.

FIG. 1 shows a typical waveguide structure comprising a silicon substrate 10, a lower $SiO_2$ cladding layer 12, a core layer 14 with ridge 14a, and an upper $SiO_2$ cladding layer 16. The upper cladding 16 has a thickness of t; etch depth is D=H−h.

Figure 2:
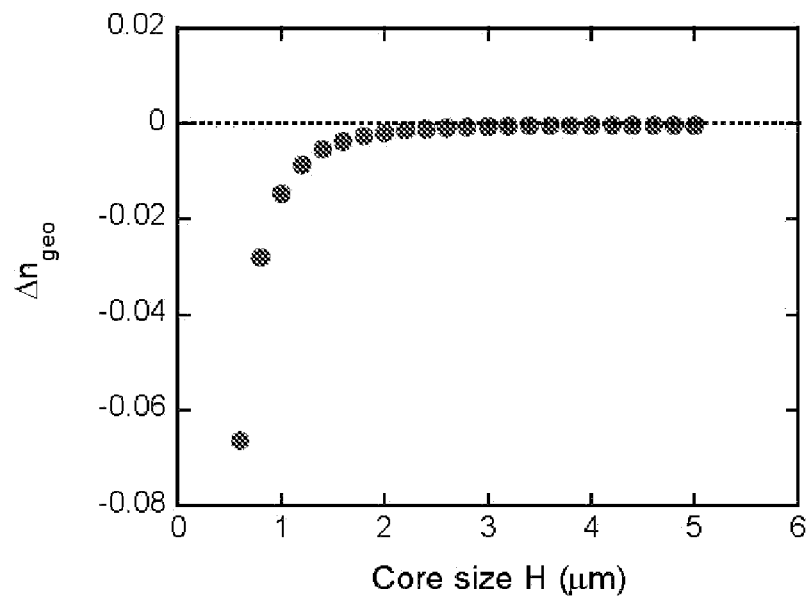
FIG. 2 shows the dependence of birefringence on the core thickness H.

FIG. 2 shows the dependence of birefringence on the core thickness H. In this example, the waveguides have the same width as the core thickness H, and are etched to half the thickness. Similar dependence is found in other waveguide cross-sections.

Figure 3:
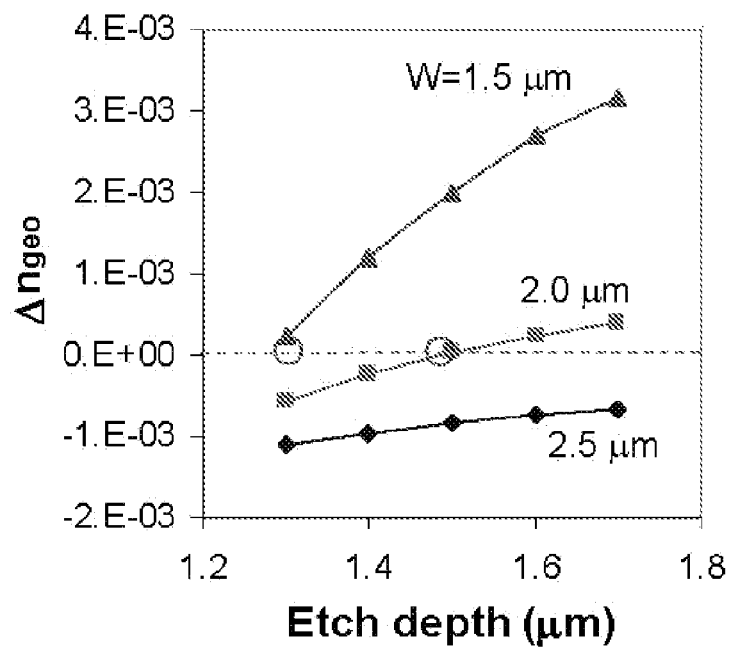
FIG. 3 shows the variations of $\Delta n_{geo}$ with the ridge etch depth, for 3 different waveguide widths W.

FIG. 3 shows the variations of $\Delta n_{geo}$ with the ridge etch depth, for 3 different waveguide widths W. In this example, the core thickness is 2.2 µm. The circles indicate the birefringence-free points.

In such a waveguide structure stress-induced changes in material refractive indices are given by:

$$n_x - n_{x0} = -C_1\sigma_x - C_2(\sigma_y + \sigma_z) \quad (1a)$$

$$n_y - n_{y0} = -C_1\sigma_y - C_2(\sigma_z + \sigma_x) \quad (1b)$$

Therefore:

$$n_x - n_y = (C_1 - C_2)(\sigma_y - \sigma_x) \quad (2)$$

Here $\sigma_i$ is the stress tensor, $n_i$ the material refractive index, $n_{i0}$ the stress-free refractive index, and $C_1$ and $C_2$ the stress-optic constants. These changes in material indices result in modified effective indices of the waveguide modes ($n_{eff}^{TE}$ and $n_{eff}^{TM}$), and the corresponding modal birefringence denoted as $\Delta n_{eff}$. This parameter is determined by both the ridge geometry and the stress distribution.

Figure 4A:
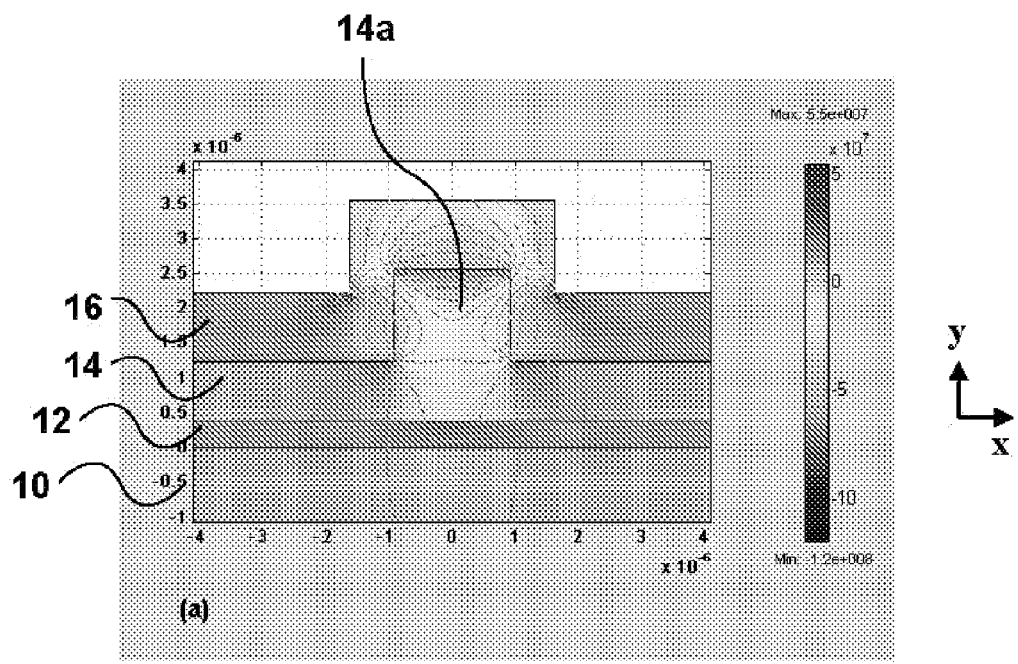
FIG. 4 shows the cross-section and stress distributions of a SOI ridge waveguide.
Figure 4B:
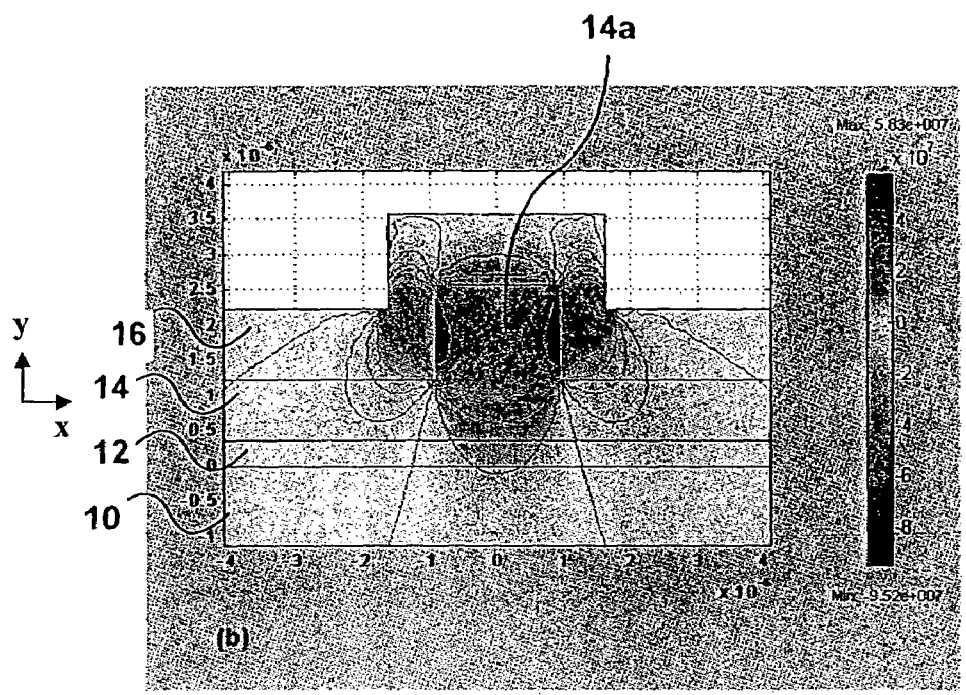

An example of cladding induced stress field in SOI waveguides is shown in FIGS. 4a and 4b. Here the cladding material is $SiO_2$, which is commonly used. Other types of materials such as silicon nitride may also be used as cladding. The upper cladding is deposited after the formation of the waveguide ridge. Common deposition methods include PECVD (plasma-enhanced chemical vapor deposition) and LPCVD (low pressure chemical vapor deposition), with wafers usually processed at elevated temperatures. It will be appreciated that other suitable deposition methods can be employed.

In the structure shown in FIGS. 4a and 4b, the buried oxide thickness (lower cladding 12) is 0.37 µm, top Si (core layer 14) thickness is 2.2 µm, ridge 14a width is 1.83 µm, etch depth is 1.34 µm, upper oxide cladding (layer 16) thickness is 1 µm. FIG. 4a shows the stress distribution in the x direction; FIG. 4b shows the stress distribution in the y direction.

The larger thermal expansion coefficient of SiO$_2$ than that of Si is the main reason that a compressive stress resides in the oxide film when the samples are cooled to room temperature. Other than the miss-match of thermal expansion coefficients between different films, the stress is also affected by the film microstructure and stoichiometry. In the absence of a ridge, the stress in the cladding film is a material related parameter, determined by the deposition conditions and material properties. For SiO$_2$ films, the stress usually varies from −100 MPa to −400 MPa, although other stress values may be obtained if so desired by changing processing conditions. From the modified index distribution, the corresponding effective indices and modal birefringence can be calculated. Examples of the calculated birefringence results are shown in FIG. 5.

Figure 5A:
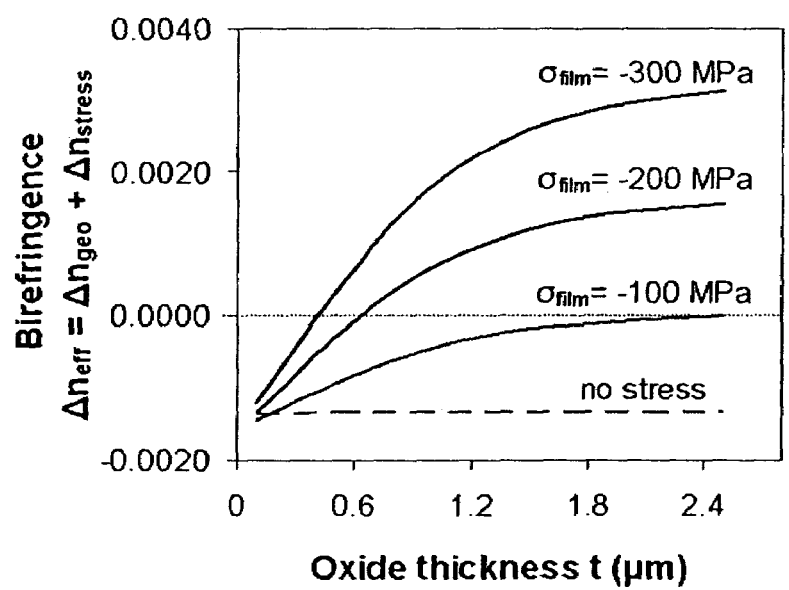
FIG. 5.(a) shows the modal birefringence $\Delta n_{eff}$ of a waveguide with oxide claddings, as a function of the upper cladding thickness and stress level.
FIGS. 5b to 5e show different waveguide profiles.

As illustrated in FIGS. 5a to 5e, a cladding with compressive stress induces a positive shift in $\Delta n_{eff}$. FIG. 5(a) shows the modal birefringence $\Delta n_{eff}$ of a waveguide with oxide claddings, as a function of the upper cladding thickness and stress level. The stress in the oxide is compressive (negative), and stress levels shown represent the in-plane stress values in the absence of a Si ridge; FIGS. 5b to 5e shows other examples of channel waveguides: (b) vertical ridge; (c) trapezoidal ridge (arbitrary angle); (d) vertical rib; and (e) trapezoidal rib (arbitrary angle).

This shift increases with the cladding thickness initially, and eventually reaches a plateau. If a cladding material with tensile stress (such as silicon nitride) is used, a negative shift in $\Delta n_{eff}$ is induced. This therefore provides two tuning parameters: one is the cladding thickness; the other is the cladding stress magnitude and sign. Waveguide profiles shown in FIG. 5(b)–(e) typically lead to different $\Delta n_{geo}$. Depending on the value and sign of $\Delta n_{geo}$, an appropriate cladding can be chosen to meet the birefringence-free requirement $\Delta_{eff}=0$.

As can be observed in FIG. 5, cladding films with lower stress levels give finer tuning resolution but limited tuning range. Changes in thickness give larger tuning for small cladding thicknesses, and $\Delta n_{eff}$ practically varies linearly with the thickness. While for thicknesses where $\Delta n_{eff}$ approaches the plateau finer tuning resolution can be obtained. Different combinations of these parameters can be selected to optimize the tuning sensitivity and tuning range, giving enhanced flexibility.

Eq. (2) shows that the material birefringence scales linearly with the stress tensor. Due to the large index contrast in HIC waveguides such as SOI, the cladding stress induced index changes are typically orders of magnitude smaller than the value of the index contrast. Consequently, the stress causes little change in the mode shape. Our simulations have revealed that the modal birefringence $\Delta n_{eff}$ can be considered to scale linearly with the stress magnitude for a fixed cladding thickness for practical designs. Due to the minimum change in mode shape caused by the stress, there is also little mode-mismatch induced polarization dependent loss (PDL), and negligible mode mismatch loss between sections of waveguides with different stress levels.

Stress-induced birefringence has been used to reduce the birefringence in silica-on-silicon waveguides. This issue, however, has not been addressed in the SOI system. In silica-based waveguides where index contrast is low, large cladding thickness is required as the optical field penetrates deeper into the cladding. Required cladding thicknesses are so large that changing the thickness has little effect on the birefringence.

As it is demonstrated in this invention, tuning cladding thickness for birefringence control is an efficient technique for HIC waveguides where the optical field is largely confined within the core area, and its penetration into the cladding is weak. The invention is described for the particular case of SOI waveguides, but the same principle is also applicable to other HIC waveguides.

As discussed above and illustrated in FIG. 3, waveguide aspect ratios determine the sensitivity of birefringence to ridge dimensions. Wide waveguides (W>H) are less sensitive to dimension fluctuations (e.g. etch depth change as shown in FIG. 6). However, a negative $\Delta n_{geo}$ persists. By incorporating a cladding layer with compressive stress, the modal birefringence $\Delta n_{eff}$ can be eliminated, as shown by the curves for W=2.5 µm guides in FIG. 6. In this example the oxide cladding film was 0.7 µm thick, the ridge height (H) 2.2 µm, and ridge width (W) 1.6, 2.0, and 2.5 µm, respectively. The solid curves show the modal birefringence including both geometrical and stress-induced birefringence for an oxide stress of $\sigma_{film}=-70$ MPa; the dashed curves show the waveguide birefringence in the absence of stress. Significantly improved process latitude can be obtained.

Prototype arrayed waveguide grating (AWG) demultiplexers have been produced which demonstrated the proposed techniques of birefringence control. In AWG demultiplexers, modal birefringence is determined from the polarization dependent wavelength shift ($\Delta\lambda$) between the central wavelengths for TM and TE modes ($\Delta\lambda=\lambda_{TM}-\lambda_{TE}$), which is related to the waveguide birefringence in the arrayed grating section by $\Delta n_{eff}=n_g\Delta\lambda/\lambda_0$ ($\lambda_0$ is the wavelength in vacuum, $n_g$ is the waveguide group index).

Using AWG demultiplexers fabricated on SOI substrates, the inventors have shown (FIG. 7) that $\Delta\lambda$ in AWGs can be varied over a wide range by changing top oxide thickness for a given stress level. With appropriately chosen oxide thickness and stress level, polarization sensitivity was virtually eliminated. The polarization induced channel wavelength shift, shown in FIG. 7(b), was reduced to 20 pm by depositing a 0.8 µm cladding oxide with a stress of −320 MPa. Without the upper cladding, $\Delta\lambda$ was approximately −0.54 nm. PDL was also negligible in these devices.

Post-process tuning can be achieved by adding or removing the appropriate thickness of the cladding layer. It can also be accomplished by changing the cladding stress using techniques such as thermal treatments, and IR or UV irradiations etc. The inventors have demonstrated post-process tuning of birefringence using rapid thermal anneals (FIG. 8). Thermal anneals decreased the stress in the oxide film, which in turn reduced $\Delta\lambda$. In the example shown in FIG. 8, $\Delta\lambda$ was reduced by RTA from 0.3 nm to below 0.1 nm.). Initial top cladding oxide thickness was 0.35 µm and the stress was −335 MPa (compressive). The anneals were done at 600° C. in nitrogen ambient.

Because of the large cladding-core index step, there is virtually no change in optical mode shape, and hence no mode-mismatch loss, between the SOI waveguides with and without a stressed cladding. A low polarization dependent loss (PDL) is expected. Stress-engineering provides an effective means of birefringence control while incurring negligible mode-mismatch loss. This makes it a superior technique compared to other methods.

Compared to other compensation method where regions with modified birefringence are introduced, this method mitigates the birefringence directly at its source, i.e. in the waveguides, which are the basic building elements of integrated optic circuits. The invention is broadly applicable in waveguide devices.

In the context of the discussion of this invention, the example of SOI channel waveguides with oxide SiO$_2$ cladding layers is used. However, the same design constraints and the principles of this invention also apply to other high-index-contrast (HIC) waveguide systems It will now be understood that the invention incorporates cladding stress in the design of waveguides, and in particular HIC waveguides, to allow for the further optimization of other design criteria, such as mode shape and waveguide bend radii with the waveguide's cross-section, and tolerance to the fabrication error in waveguide dimensions.

The invention permits birefringence free operations to ensure by selecting suitable tensile or compressive stress with the appropriate magnitude in the cladding. Selecting appropriate combinations of cladding thickness and stress level optimize the tuning range and sensitivity. The cladding thickness and stress magnitude can also be employed as part of a post-process tuning process.

The invention is applicable to photonic devices incorporating a waveguide, including and not limited to interferometric-based devices, such as the Mach-Zenhder interferometer, ring resonator, arrayed-waveguide-grating, truncated arrayed waveguide grating, and components requiring accurate phase matching, such as silicon Raman amplifiers.

What is claimed is:

1. A method of making a photonic silicon-on-insulator (SOI) device incorporating a silicon-on-insulator waveguide having a waveguide core, comprising:
   a) designing a high index contrast silicon-on-insulator waveguide with a predetermined cross sectional geometry and dimensions optimized for design criteria other than final birefringence;
   b) determining the geometrical birefringence of the waveguide designed in step a);
   c) determining a target amount, which may be zero, of overall birefringence desired in said waveguide;
   d) determining an amount of stress to be induced in said waveguide core to achieve a stress-induced birefringence such that a combination of said stress-induced birefringence and said geometrical birefringence results in a final birefringence equal to said target amount;
   e) fabricating said waveguide; and
   f) inducing within said waveguide the amount of stress determined in step d).

2. The method of claim 1, wherein said waveguide includes at least one cladding layer, and the amount of said stress is controlled by adjusting deposition conditions of said at least cladding layer.

3. The method of claim 2, wherein the thickness of said at least one cladding layer is adjusted in association with the deposition conditions.

4. The method of claim 3, wherein said deposition conditions and said thickness are selected to tune said final birefringence to said target amount.

5. The method of claim 2, wherein said at least one cladding layer is deposited by a method selected from the group consisting of: PECVD and LPCVD.

6. The method of claim 1, wherein said amount of induced stress is adjusted to make said device birefringence free.

7. The method of claim 1, wherein said amount of induced stress is adjusted to set the final birefringence at a predetermined non-zero value.

8. The method of claim 1, wherein said other criteria are selected from the group consisting of: mode shape, waveguide bend radii, and tolerance to the fabrication error in waveguide dimensions.

9. The method of claim 1, wherein said final birefringence is adjusted by subjecting said fabricated device to a post process treatment to modify the stress induced therein.

10. The method of claim 9, wherein said device has a at least one cladding layer, and said post process treatment comprises adding or removing some of said cladding layer.

11. The method of claim 10, wherein said post process treatment is selected from the group consisting of: thermal treatment, infrared radiation and ultraviolet radiation.

12. The method of claim 11, wherein said post process treatment is a rapid thermal anneal.

13. A photonic device, comprising:
   a high index contrast waveguide formed on a silicon-on-insulator substrate with a core having an inherent birefringence predominantly determined by cross-sectional geometry and dimensions;
   wherein said core has a cross-sectional geometry and dimensions that are optimized for design criteria other than final birefringence;
   wherein said waveguide comprises one or more cladding layers that are stressed to create a predetermined stress-induced birefringence in said core; and
   whereby said device has an exhibited final birefringence that is the result of said inherent geometrical birefringence and said stress induced birefringence caused by said one or more cladding layers.

14. The photonic device of claim 13, wherein said core and said one or more cladding layers have different coefficients of thermal expansion, and wherein said stress is induced as a result of the different coefficients of thermal expansion of said core and cladding layer.

15. The photonic device of claim 13, wherein said final birefringence is substantially zero.

16. The photonic device of claim 13, wherein said final birefringence has a predetermined non-zero value.

17. The photonic device of claim 13, which is an arrayed waveguide demultiplexer.

18. The method of claim 2, wherein said at least one cladding layer is of dopant free.

19. The photonic device of claim 13, wherein said one or more cladding layers are dopant free.

* * * * *